US008386469B2

(12) United States Patent
Reuther et al.

(10) Patent No.: US 8,386,469 B2
(45) Date of Patent: *Feb. 26, 2013

(54) METHOD AND SYSTEM FOR DETERMINING RELEVANT SOURCES, QUERYING AND MERGING RESULTS FROM MULTIPLE CONTENT SOURCES

(75) Inventors: Phyllis Reuther, Milbrae, CA (US); David Kurtz, Redwood City, CA (US); Michael Connor, Oakland, CA (US)

(73) Assignee: Mobile Content Networks, Inc., Mountain View, CA (US)

( * ) Notice: Subject to any disclaimer, the term of this patent is extended or adjusted under 35 U.S.C. 154(b) by 497 days.

This patent is subject to a terminal disclaimer.

(21) Appl. No.: 11/672,306

(22) Filed: Feb. 7, 2007

(65) Prior Publication Data
US 2007/0192300 A1  Aug. 16, 2007

Related U.S. Application Data

(60) Provisional application No. 60/766,892, filed on Feb. 16, 2006.

(51) Int. Cl.
G06F 7/00 (2006.01)
G06F 17/30 (2006.01)
(52) U.S. Cl. .......................... 707/715; 707/713; 707/731
(58) Field of Classification Search .................. None
See application file for complete search history.

(56) References Cited

U.S. PATENT DOCUMENTS

| 5,822,720 | A | | 10/1998 | Bookman et al. |
| 5,924,090 | A | * | 7/1999 | Krellenstein .................. 1/1 |
| 6,601,061 | B1 | | 7/2003 | Holt et al. |
| 6,728,704 | B2 | | 4/2004 | Mao et al. |
| 6,738,764 | B2 | | 5/2004 | Mao et al. |
| 6,795,820 | B2 | | 9/2004 | Barnett |
| 6,895,430 | B1 | | 5/2005 | Schneider |
| 7,181,438 | B1 | * | 2/2007 | Szabo ............................... 707/2 |
| 2002/0143798 | A1 | * | 10/2002 | Lisiecki et al. ............... 707/200 |
| 2003/0220913 | A1 | * | 11/2003 | Doganata et al. ................. 707/3 |
| 2004/0059708 | A1 | | 3/2004 | Dean et al. |
| 2004/0153440 | A1 | * | 8/2004 | Halevy et al. ..................... 707/3 |
| 2004/0249789 | A1 | * | 12/2004 | Kapoor et al. .................... 707/2 |

(Continued)

FOREIGN PATENT DOCUMENTS

| JP | 07-056932 | 3/1995 |
| JP | 2002-351913 | 12/2002 |

(Continued)

OTHER PUBLICATIONS

International Search Report mailed Feb. 15, 2008.

(Continued)

Primary Examiner — Rehana Perveen
Assistant Examiner — Raheem Hoffler
(74) Attorney, Agent, or Firm — Wilmer Cutler Pickering Hale and Dorr LLP

(57) ABSTRACT

According to an embodiment of the present invention, a computer implemented method and system for processing a query may include receiving a query from a user device; categorizing the query to identify one or more content sources; formatting the query according to one or more content source specifics for the one or more content sources; transmitting the formatted query for the one or more content sources to the one or more content sources; merging results in response to the formatted query from the one or more content sources based at least in part on one or more factors; and formatting the results for delivering to the user device.

59 Claims, 6 Drawing Sheets

U.S. PATENT DOCUMENTS

| | | | |
|---|---|---|---|
| 2005/0114306 A1 | 5/2005 | Shu et al. | |
| 2005/0131872 A1 | 6/2005 | Calbucci et al. | |
| 2005/0149496 A1 | 7/2005 | Mukherjee | |
| 2005/0165777 A1 | 7/2005 | Hurst-Hiller et al. | |
| 2005/0222989 A1 | 10/2005 | Haveliwala et al. | |
| 2005/0278321 A1 | 12/2005 | Vailaya et al. | |
| 2006/0047648 A1* | 3/2006 | Martin | 707/4 |
| 2006/0053174 A1 | 3/2006 | Gardner et al. | |
| 2006/0075120 A1* | 4/2006 | Smit | 709/227 |
| 2006/0122979 A1* | 6/2006 | Kapur et al. | 707/3 |
| 2006/0161557 A1* | 7/2006 | Dettinger et al. | 707/100 |
| 2006/0212350 A1 | 9/2006 | Ellis et al. | |
| 2007/0022103 A1* | 1/2007 | Rys et al. | 707/3 |
| 2007/0061318 A1* | 3/2007 | Azizi et al. | 707/4 |
| 2007/0162432 A1* | 7/2007 | Armstrong et al. | 707/3 |
| 2007/0192293 A1* | 8/2007 | Swen | 707/3 |
| 2007/0255677 A1* | 11/2007 | Alexander et al. | 707/1 |
| 2008/0109285 A1 | 5/2008 | Reuther et al. | |

FOREIGN PATENT DOCUMENTS

JP  05-216302  8/2005

OTHER PUBLICATIONS

Supplementary European Search Report and European Search Opinion for PCT/US2007/004033; mailed Sep. 17, 2009; 6 pages.

International Search Report and the Written Opinion of the Int'l Searching Authority for PCT/US07/22688 mailed Apr. 8, 2008; 7 pages.

Ichiro et al., "Multi-database Retrieval System by WWW," WebSENA NTT Technical Journal, Japan, The Telecommunications Association, vol. 10, pp. 55-58 (May 1, 1998)—Japanese version only.

* cited by examiner

Example: $score_{ij} = 1/m_j * n_i$, for $i = 1..\#sources$; $j = 1..\#items$ returned by $source_i$ Results returned from Source A ($n_A = 80$) 600a

| $m_{Aj}$ 610a | Source A Results Set | Score Calculation | $score_{Aj}$ 640a |
|---|---|---|---|
| 1 | A 1 | 1/1 * 80 | 80 |
| 2 | A 2 | 1/2 * 80 | 40 |
| 3 | A 3 | 1/3 * 80 | 27 |
| 4 | A 4 | 1/4 * 80 | 20 |
| 5 | A 5 | 1/5 * 80 | 15 |
| 6 | A 6 | 1/6 * 80 | 13 |
| 7 | A 7 | 1/7 * 80 | 11 |
| 8 | A 8 | 1/8 * 80 | 10 |
| 9 | A 9 | 1/9 * 80 | 9 |
| 10 | A 10 | 1/10 * 80 | 8 |

Results returned from Source B ($n_B = 50$) 600b

| $m_{Bj}$ 610b | Source B Results Set | Score Calculation | $score_{Bj}$ 640b |
|---|---|---|---|
| 1 | B 1 | 1/1 * 50 | 50 |
| 2 | B 2 | 1/2 * 50 | 25 |
| 3 | B 3 | 1/3 * 50 | 17 |
| 4 | B 4 | 1/4 * 50 | 13 |
| 5 | B 5 | 1/5 * 50 | 10 |
| 6 | B 6 | 1/6 * 50 | 8 |
| 7 | B 7 | 1/7 * 50 | 7 |
| 8 | B 8 | 1/8 * 50 | 6 |
| 9 | B 9 | 1/9 * 50 | 5 |
| 10 | B 10 | 1/10 * 50 | 5 |

Combined Results Set 650

| Item Rank | New Results Set |
|---|---|
| 1 | A 1 |
| 2 | B 1 |
| 3 | A 2 |
| 4 | A 3 |
| 5 | B 2 |
| 6 | A 4 |
| 7 | B 3 |
| 8 | A 5 |
| 9 | A 6 |
| 10 | B 4 |
| 11 | A 7 |
| 12 | B 5 |
| 13 | A 8 |
| 14 | A 9 |
| 15 | A 10 |
| 16 | B 6 |
| 17 | B 7 |
| 18 | B 8 |
| 19 | B 9 |
| 20 | B 10 |

Figure 6

METHOD AND SYSTEM FOR DETERMINING RELEVANT SOURCES, QUERYING AND MERGING RESULTS FROM MULTIPLE CONTENT SOURCES

CROSS-REFERENCE TO RELATED APPLICATIONS

This patent application claims priority to U.S. Provisional Patent Application No. 60/766,892, filed Feb. 16, 2006, which is hereby incorporated by reference herein in its entirety.

FIELD OF THE INVENTION

The present invention relates generally to computerized techniques for information retrieval, and more particularly, to federated search and retrieval techniques which include dynamically categorizing a query to identify multiple content sources accessible via a network, caching results returned from the multiple sources and further merging results from the multiple sources based at least in part on source ratings, user ratings, business consideration, and/or other factors.

BACKGROUND OF THE INVENTION

Inexpensive computer and networking technologies have made large quantities of digital content available to Internet and mobile network users, resulting in information overload. As a result, users have access to much more information and entertainment than they can consistently and reliably locate, even via large-scale, centralized public search engines.

Concurrently, significant practical and commercial value has been provided by text and data search technologies, the goal of which is to identify the information of greatest utility to a user within a given content collection, such as the information that is created and managed by large-scale publicly available internet search engines.

The resulting proliferation and commoditization of information search and retrieval technologies have created an increasing number of proprietary commercial data, media and text collections, independently indexed and maintained by content sources. These content sources have limited economic incentive to make their digital content fully accessible for indexing by public search engines and the public search engines attain more economic benefit by having these sources sign on as advertisers than by providing their users with direct access to the actual content.

Most contemporary search engines are designed to pre-index a collection of resources (e.g. document, image, web site), then, in response to a query, examine collections in one or a group of computers for content that satisfies the query and return an ordered list of possible matches to the user as a results set. A result item metadata that indicates relevance ranking, meaning how closely the content matches the query, may be explicitly returned or may be given implicitly in the order of items in the results set, usually with the most relevant item at the top of the list. Rankings may be based on a numerical similarity scoring value or one of many possible metrics previously computed against the content and stored with the full-text or database index or indexes by the content publisher.

Search engine query and indexing architectures vary to at least three types: centralized indexing, metasearch, and federated search engines. Each type may be used to conduct searches against different types of content collections. For example, centralized indexes may be used to facilitate searches over fully accessible, homogeneous content, such as is found in single enterprise content management systems or the plethora of publicly available, internet-enabled websites.

A metasearch engine may combine results from several external search engines or database indexes. It has colloquially come to mean a search across collections with homogeneous, textual content collection indexes, e.g. multiple internet search engines or bibliographic databases.

A federated search may also combine results from more than one search, with each search typically being conducted over heterogeneous content collections, such as are associated with different types of indexing engines, e.g. mixing content from full-text search engines and databases, different information resources such as from different file servers or different content types, or requiring access to differing proprietary collections as when searching multiple sports sites including sports news, sports apparel, and sports team merchandise.

For a metasearch or federated search to be maximally precise, it should find the resources that score highest with respect to the metacollection, not necessarily those that score highest with respect to the individual collections in which they reside. For example, in a federated search over the combination of two different collections: sports and technology news; if a query contains the term "computer", an incorrect implementation would give undue weight to computer-related documents that appear in the sports collection. The practical impacts of this effect are substantial to the extent that a metacollection is used to cull information from diverse collections, each with a different specialty or focus.

In addition to traditional content access via stationary computers, there has been an explosive proliferation of internet access using mobile computing devices such as laptops, personal digital assistants (PDAs), and mobile telephones. This proliferation is markedly changing the nature of content access while content publishers reformat and reorganize their content for mobile access. While a desktop computer user can comfortably search for information, using multiple tries and browsing, mobile computing users are generally limited by small screen and input ergonomics, location-specificity, and their own mobility. Due to these constraints, mobile computing users are less likely to want to receive all possibly relevant results, and more likely to want specific information immediately.

This changing nature of content access plays a large part in increasing the value of information retrieval precision over recall with new search and retrieval processes emphasizing the highest possible precision in the first five to ten entries of the results set. For the same reasons, mobile users also require the shortest path to their desired content. Therefore, search results items should allow the user to directly access interesting content items rather than providing access to a list of content sources.

Other challenges to federated search functionality may also be present. Different sources may index their content collections using different algorithms or by processing the same algorithms against different sections of text and/or metadata. Thus local source calculated ranking statistics may not be compared directly when combining results sets.

Different sources may contain overlapping resource collections, which may result in the same content item appearing in results sets from both sources. Traditional de-duplication algorithms remove all duplicates based on a metadata field value or set of field values. For example, a news source may remove all content items with the same headline, byline, and date values.

Various sources may contain similar content but include varying depth of content (extensiveness of the collection) or may vary in response characteristics (latency, percent uptime). These variations can negatively impact the user experience by generating insufficient results or by not responding before system or user-perceived timeouts. Federated searching across multiple content sources improves the chance that the user will get some response to their query within a reasonably time frame.

Additionally, there may be wide variation in relevance of a content collection to the query. Not all available content sources contain collections sufficiently relevant to warrant inclusion in the metacollection.

SUMMARY OF THE INVENTION

Accordingly, one aspect of the invention is to address one or more of the issues set forth above. According to an exemplary embodiment of the present invention, a computer implemented method for processing a query, the method comprising the steps of: receiving a query from a user device; categorizing the query to identify one or more relevant content sources; retrieving the query results previously received from one or more content sources and stored in local caches, if available; if not available: formatting the query according to one or more content source-specific query languages for the one or more content sources; transmitting the formatted query for the one or more content sources to the one or more content sources; caching the results as they are received from the one or more content sources; merging results in response to the formatted query to the one or more content sources; merging results based at least in part on one or more user, source, content, and/or distribution channel ranking factors, while de-duplicating items according to known or perceived user or distributor preferences; formatting the results for delivering to the user based on device or requester characteristics; and returning the formatted results to the requester.

In accordance with other aspects of this exemplary embodiment of the present invention, the method may further include wherein the requesting device comprises one or more of an internet-enabled input device, an internet or voice-enabled mobile device, a voice-enabled input device, a computer, and a kiosk; wherein the content source comprises one or more of search engines, ad engines, content delivery systems, and databases associated with the content sources; wherein the one or more user ranking factors comprise at least one or more of user demographic characteristics, location, language, social networks and groups, and personalization characteristics; wherein the one or more content ranking factors comprise at least one or more of page size, graphic, text elements, and text; wherein the one or more source ranking factors comprise at least one or more of source rating, reliability factor, latency factor, overall content relevance and content extensiveness or coverage; wherein the one or more distribution channel ranking factors comprise at least one or more of business rules, business relationships, demographic preferences, and marketing goals; wherein the query is categorized into relevant categories in one or more subject or functional taxonomy or controlled vocabularies; wherein the query further comprises one or more of user preferences, device specifics and formatting limitations; the method further comprises the step of storing results from each content source in one or more caches; wherein the cache is query specific; wherein the cache is source specific; the method further comprising the steps of accessing the one or more caches to retrieve existing results; wherein the results are merged based at least in part on one or more user, content, source, and/or distribution channel factors; wherein the one or more result ranking factors comprise one or more of source rating, metadata relevancy factor, similarity factor and ranking factor.

In accordance with other aspects of this exemplary embodiment of the present invention, the method may further include wherein, at each content source query-results cache, dynamically computing one or more local ranking statistics for each results item related to one or more terms associated with the query and related to metadata in the query context; the method further comprises the steps of computing at least one global statistic related to one or more content items in the results sets and computing a normalization factor; the method further comprises the step of determining one or more relevancy scores for the results items from the one or more content sources in accordance with the at least one global and/or one local statistic; the method further comprises the step of normalizing the one or more relevancy scores in accordance with the normalization factor; the method further comprises the step of combining the results into a single results set based on an ordering determined by the normalization factor; and formatting the retrieved existing results based on one or more query context parameters.

According to an exemplary embodiment of the present invention, a computer implemented system for processing a query, the system comprising a receiving module for receiving a query from a user device; a query categorizing module for categorizing the query to identify one or more content sources; a formatting module for formatting the query for the one or more content sources according to their specific query languages; a transmitting module for transmitting the formatted query for the one or more content sources to the one or more content sources, possibly employing proprietary transmission modules for those sources; a caching module for storing results received from one or more content sources; a merging module for merging results in response to the formatted query from the one or more content sources based at least in part on one or more ranking factors; and a results module for formatting the results for delivering to the user device.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

FIG. 6 is an exemplary illustration of reranking results, according to an embodiment of the present invention.

DETAILED DESCRIPTION OF EXEMPLARY EMBODIMENT(S)

Figure 1:
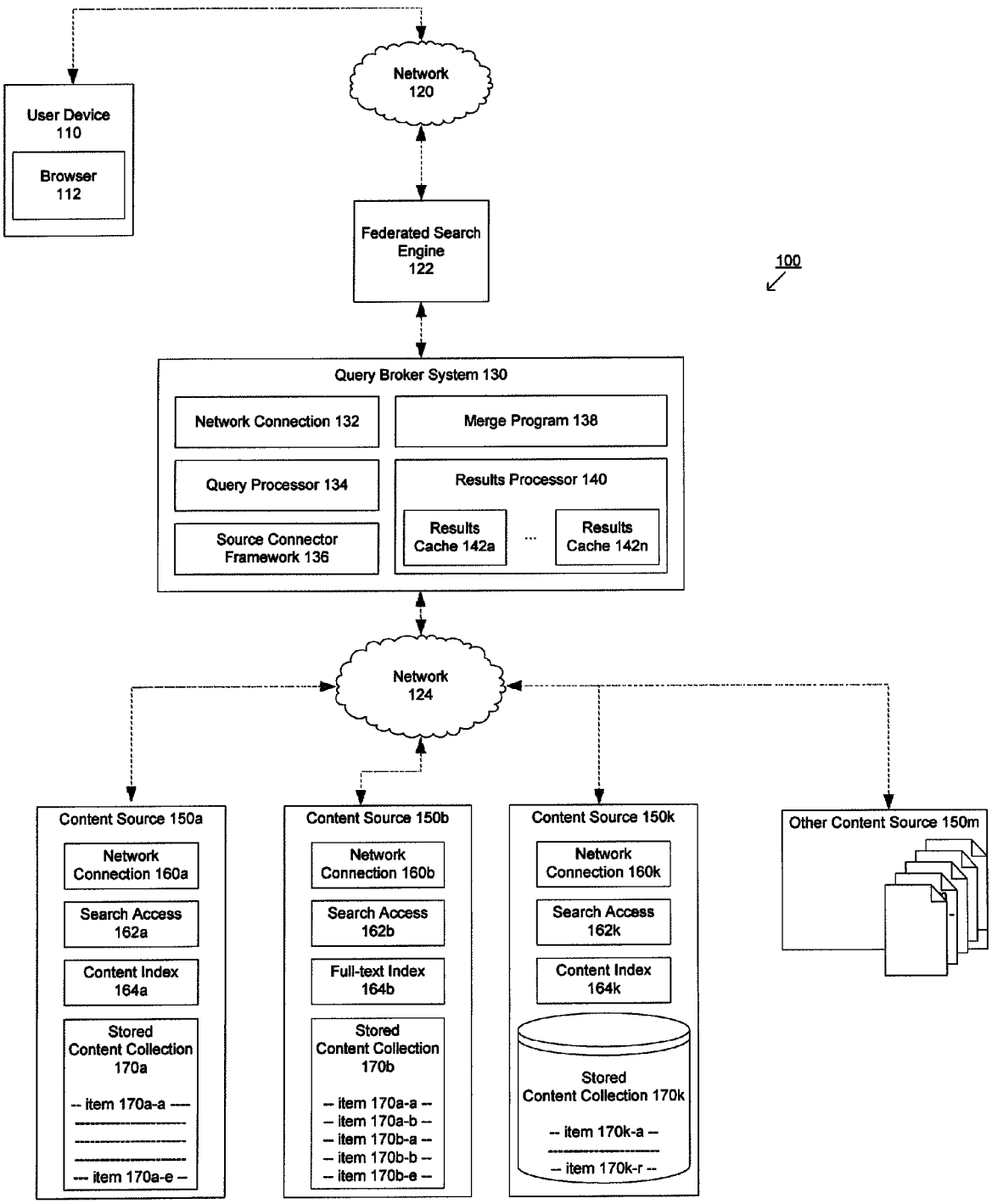
FIG. 1 is an exemplary diagram of a system for federated search queries to multiple content sources, according to an embodiment of the present invention.

The various embodiments of the present invention are directed to returning search results in a manner that maximizes results relevance while minimizing user perceived latency and platform resources, including consumed memory, processing, and network requirements. These qualities become increasingly important as the result set sizes and number of sources increase.

The following definitions are merely exemplary and referenced herein to illustrate the various embodiments of the present invention described below. The embodiments and scope of the inventions are not limited by the definitions set forth below.

Search engine: may refer to computer programs designed to index, store and retrieve information based on instructions from the user via a query. A process that executes an individual search against a single collection is called a search engine. A process that executes a search against multiple search engines and/or databases and combines results is known as a federated or metasearch engine.

A method of ranking search results may involve determining a relevance score for a resource (e.g., resource, website, image) in view of a query. A similarity score may be calculated for the query utilizing a feature vector that characterizes attributes and query words associated with the result. A rank value may be assigned to the result based on the relevance score, similarity score and/or other factors and criteria. In addition, search results may be improved by adaptively ranking, based on prior behavior of users and resources returned from a text search engine, or other content source. More particularly, prior behavior of users may be assessed to determine a rate at which to apply adaptive correction for a given query.

Results lists are merged with a goal of placing the most relevant entries first for the user's convenience. To reduce the associated computational overhead, lists may not be merged based on an examination of every single entry. Rather, the lists may be merged based on an examination of a smaller number of entries from each list. A subset of entries may be selected from each list and the lists may be merged according to these subsets, rather than upon an evaluation of every single entry of every single list. The subsets may be selected according to a technique for selecting a few items out of a larger group. For example, a number n may be chosen and the top n resources may be selected from each list. According to another example, a number may be again chosen where the merging algorithm selects n resources that are uniformly spaced within each result list. According to yet another example, a number may be chosen and n resources may be selected at random from each list.

A scoring value may be determined for each entry in the various subsets selected. Scoring values may be numbers that typically represent how closely the entry matches the query, where certain number ranges indicate an entry that is likely to be relevant to the user. A representative score of all scoring values may be determined. The representative score may be an arithmetic average or a value proportional to the average for a set of scoring values.

All entries from all lists may then be merged or ranked based on at least the representative score for each list. Once each result list has a representative score assigned, it may be merged with the other lists accordingly. For example, entries may be merged by selecting the list with the highest representative value (e.g., highest average scoring value). The first entry on the list that has not already been selected may then be picked. That list's representative value may then be decremented by a fixed amount and the process may be repeated until all entries have been picked. If any representative value drops below zero after decrementing, it may be reset to its initial value or a predetermined value.

According to another example, entries may be merged using a probabilistic approach where each list may be assigned a probability value equal to its representative value's percentage of the total representative values for all lists. Lists may then be selected according to their probability value, with lists having higher probability values being more likely to be selected. When a list is selected, the first entry on that list that has not already been selected is picked. This process may be repeated, with the total representative value being revised when all entries of a list are picked.

Content Source: may refer to a publisher having collections of digital or non-digital content available via a network.

(Content) Source Ratings may refer to scores used to measure the relative usability of content sources for types of queries. Content source ratings may also be calculated by including content factors such as extensiveness or coverage, classification reliability, content quality and/or other information that affects the source's results relevance. Ratings may also be affected by business relationships and usage patterns. For example, a business relationship between a content source and a distributor may increase a source's rating in order to either choose a source over other sources in the source library, or to give the content source results items preference over other source results in the combined results set. Sources with a high percentage of no results returned may have a lower rating than one wherein a high percentage of queries have results items returned.

Source ratings may also consider performance factors such as latency, response reliability and/or other criteria. For example, reliability may refer to percentage of uptime for the source in an average one month period (or other time period). Latency may be measured as the time for query transmission by the query broker system to the content source plus the return trip time for the results set from the source back to the query broker system. For example, a source rating may be calculated by combining objective measures of the reliability of the source in responding to queries and the response latency with subjective measures of content coverage. For example, sources that are available 99% of a 24 hour day may have a higher source rating than those which are only available 93% of the day.

In addition, source ratings may be updated in response to variety of factors, such as, but not limited to, a query or set of queries, user traffic patterns, source responses, and/or advertising/marketing campaign considerations, using adaptive processes that depend on responses to prior queries, user choices, or other dynamic events.

Query: may refer to a request that describes or identifies information or data being sought by the user. The query may include various combinations of text, non-text, and/or user selected categories. For example, queries may include keywords (e.g., terms, phrases, natural-language sentences), as well as non-text queries (e.g. multimedia such as pictures or audio clips, and/or numerical queries such as auction bids, purchase prices, or travel dates), and/or categories (e.g. music genres such as Rock, Pop, or Urban).

Various combinations of query types and formats may be applied. For example, in the case of a travel reservation, a query may include a date range, departure and destination city pair and/or a number of people traveling. In the case of an audio file, the query may include verbal or musical phrases as well as artist names, song titles, etc. In more complex scenarios, a query may be characterized in terms of stock quotes, stock price derivatives, signal patterns, or isobars.

The user may transmit a query through a remote device, such as a phone, PDA and/or other mobile device. Further, the user may use a computer or other communication device to transmit a query.

Query Context: may include demographic information, such as user sex, age, and marital status; social networking information such as community, locale, group memberships; and/or other data may also be received by a search engine. A query context may include other user specifics such as language preferences, display preferences, time/date data and/or other information. A query context may include type of device (e.g., mobile phone, laptop computer, PDA, game console), device settings/limitations (e.g., size, graphics, audio, video, memory), response display settings (e.g., font, color). A query context may include a user's current location and/or preferred location, which may be used to preference relevant search results for location-related queries. For example, a user may search for a nearby pizzeria. The search engine may automatically return a list of pizza restaurants closest to the user's current location.

The query context may be automatically retrieved from the device and included in the query. In addition, the user may access a webpage or other user interface to provide and/or update user preferences, settings and/or other data to be included in the context.

Stored Query: The user may pre-program frequent searches, such as stock quotes, weather, update on favorite celebrities, etc. with no change to the underlying technology.

Results Item: An atomic piece of information. A results item is returned by a search engine and is used to refer to a specific document. Results items may include location of the information resource, and various other metadata values such as description, title, price, etc.

Results Set: A list of results items returned from a search engine in response to a query.

Categorization: may be defined as the placement of entities in groups, potentially hierarchical structured as taxonomies, whose members bear some similarity to each other. Categorization systems may involve the assignment to a resource of one or more group labels intended to represent the intellectual, functional, or conceptual content of that resource. These labels are usually drawn from a controlled vocabulary that normalizes the terminology and provides for communication between the information retrieval system and the individual or several information retrieval systems by specifying a set of authorized terms or labels that can be used to pose search queries.

Taxonomy: may be a hierarchically-arranged controlled vocabulary used to organize content in a collection. Internet search engines may have one or more associated taxonomies to facilitate browsing search of the content collection. Web application developers and marketing may have split the organization of resources into two separate representations to satisfy the organizational uses of different stakeholders. A single taxonomy node is called a taxon. The plural of taxon is taxa.

Reference Taxonomy: may be fine-grained, monotonically expanding taxonomy used as a structure for manual or machine classification of the content items stored in the local collection.

Display Taxonomy: may be a subset of the reference taxonomy and is used for display to individuals accessing the search engine. This display taxonomy may be more mutable than the reference taxonomy because it is used to highlight categories for individual browsing searches and content source staff may determine that it is more important to highlight one area of content this week and a different area next week. Even if the display taxonomy changes, the reference taxonomy will remain unchanged to avoid re-categorizing the entire content collection.

Source Taxonomy: may be the display taxonomy for a content source accessible by a federated search engine. In a federated search system, there may be three levels of organization. For example, in addition to the display taxonomy viewable by individuals and a reference taxonomy level for organizing the resources available in the metacollection, the content source display taxonomies are indirectly available for user browsing.

The present invention relates in particular, to a method and system for an improved federated or metasearch engine which categorizes the query and query context to choose the most relevant source(s) from the set of multiple, distributed, heterogeneous content sources to generate a combined search results set, ordered using source, user, distributor ratings and/or other factors with minimum latency to the user.

FIG. 1 is an exemplary diagram of a system 100 for federated searching to multiple content sources, according to an embodiment of the present invention. The components of system 100 may be further duplicated, combined and/or separated to support various applications of the embodiments of the present invention. Additional elements may also be implemented in the system to support various applications.

System 100 is used to send a search query from User Device 110 to Federated Search Engine 122 to request a set of results items detailing the location of content resources which satisfy the user query. User Device 110 may include a computer input device containing a client or browser program 112 that allows users to access the Internet. User Device 110 may include a mobile device or other communication device, including a terminal, such as a kiosk or desktop computer. User Device 110 may communicate via Network 120, which may include the Internet or other network, to Federated Search Engine 122. Federated Search Engine 122 may operate in a client-server, peer-to-peer, and/or other configuration.

Search Engine 122 may include a Query Broker System 130 with source selection, results caches and an associated merging program merging source-specific result sets. While shown separately, Search Engine 122 and Query Broker System 130 may be a single unit.

Query Broker System 130 may communicate through Network 120 by wired or wireless network connection to user devices (e.g., User Device 110) and further communicate through Network 124 to content sources (e.g., Content Sources 150a, 150b, . . . 150k, . . . 150m), databases (as represented by Database 170k) and/or Other Sources 150m, e.g. "on-deck" content sources.

Query Broker System 130 may include various modules to perform functionality associated with searching, retrieving and/or other processing. For example, Query Broker System 130 may include a Network Connection 132, Query Processor 134, Connector Framework 136, Merge Process 138, Results Processor 140, Results Caches 142a . . . 142n and/or other module(s). The various components of system 100 may be further duplicated, combined and/or integrated to support various applications and platforms. In addition, the modules, caches and other components may be implemented across multiple systems, platforms, applications, etc. Additional elements may also be implemented in the system to support various applications.

Network Connection module 132 may manage a balanced exchange of data across network 120, network 124 and/or other networks and communication portals.

Query Processor 134 may dynamically classify queries. An embodiment of the present invention provides dynamic classification of a user query and/or query state using a taxonomic structure organizing any of content publishers, location, content subject or function, and/or other relevant content distinctions. The categorization functionality of the Query Processor 134 may select or identify a relevant content source subset from a library of sources. By dynamically computing the set of sources relevant to the user's information request at the time a query is presented, an embodiment of the present invention maximizes precision while minimizing retrieval costs of non-relevant content.

Query Processor 134 may reformat the query into the source-specific query language and Source Connector Framework 136 may transmit the reformatted query to the respective content source(s). By reformatting the query into source-specific query language, more accurate results may be obtained more efficiently. In response, results sets may be received from the respective content sources by the Source Connector Framework 136.

Content Sources 150a . . . 150m facilitate information retrieval from their content collections using several modules. Content Sources may communicate through Network 160a . . . 160m by wired or wireless network connection to user devices or other programs. Search Engine Access module 162a . . . 162m may provide for parsing the incoming query using the search engine proprietary indexing algorithm, matching the query to the content index and returning results sets that include metadata such as the description and location of the matching content items. Index 164a . . . 164m may include a storage mechanism and computer program that may include metadata, text and/or other attributes from the resources contained in the source's content collection. The Stored Content Collection modules 170a . . . 170m may include resources, multimedia, and/or other content indexed by the search engine, referenced by the metadata and accessible via the location listed in the results set.

The modules and other components of Content Sources may be implemented across multiple systems, platforms, applications, etc. Additional elements may also be implemented in the Content Source systems to support various applications.

The Stored Content Collections may include data items such as collection items [170a-a . . . 170a-e], and [170a-a, 170a-b, 170b-a, 170b-b, 170b-e]. For example, content items may appear in one collection, as in items [170a-a . . . 170a-e]. However, content items may also appear in more than one collection, as depicted by the overlap of the content sets [170a-a, 170a-b] in collections 170a and 170b. In such a case, multiple references to the same content may appear in the results set of a federated search which invokes both of these external engines. This situation may exist when content resellers publish the same content to their respective constituents, varying the presentation to the user by various factors such as language, content ranking, organization, billing arrangement and/or other consideration. The federated search engine may further retain or remove duplicates in such a way as to create a fair representation of multiple collections.

According to an embodiment of the present invention, Source Connector Framework 136 may receive the results from the individual content sources (e.g., search engines, databases, other sources of data, etc.) and further store the results in query/source-specific Results Caches 142a . . . 142n. A Results cache may contain the results set returned from a content source in response to a specific query, e.g. keyword, term set, hummed phrase, or category. Results Caches may also be time-sensitive where the results become unusable after a predetermined period of time, such as a specified number of minutes or hours, to retain content freshness. Caches may also have an associated unique cache key which may include source identification, query or category terms, and/or other factors to facilitate reuse.

Query-specific caches (e.g., Results Caches 142a . . . 142n) may store results returned from content sources 150a . . . 150m and store merged results sets for post-processing at Results Processor 140. Results Processor 140 may then compile and possibly cache the combined list to produce a single ranked results list for the user using Merge Process 138. The separate source-specific lists and the combined lists may be reusable within a configurable time period for responses to subsequent queries by the same or other users.

Merge Process 138 may merge different result sets into a single list (or other format) in an order based on various factors: after most or all results are received; when a time threshold passes; or other condition is met. For example, an embodiment of the present invention may be directed to merging results, after waiting 100 ms for source responses, based on source ratings. In addition, the results may also be ranked based on internal content relevancy scores, and/or other result specific criteria. For example, after individual results are received, the Merge Process 138 may merge the source-specific results according to a merging algorithm or program, which may include local ranking scores, source ordering values, source-specific general scores and/or other source factors as well as result-based ranking, such as relevancy or accuracy, and usage factors such as demographics, traffic patterns, user personalization and community values, etc. The Merge Process 138 may retain or remove duplicate results according to user, device and/or other preferences or processes that may be applied to the results.

Figure 2:
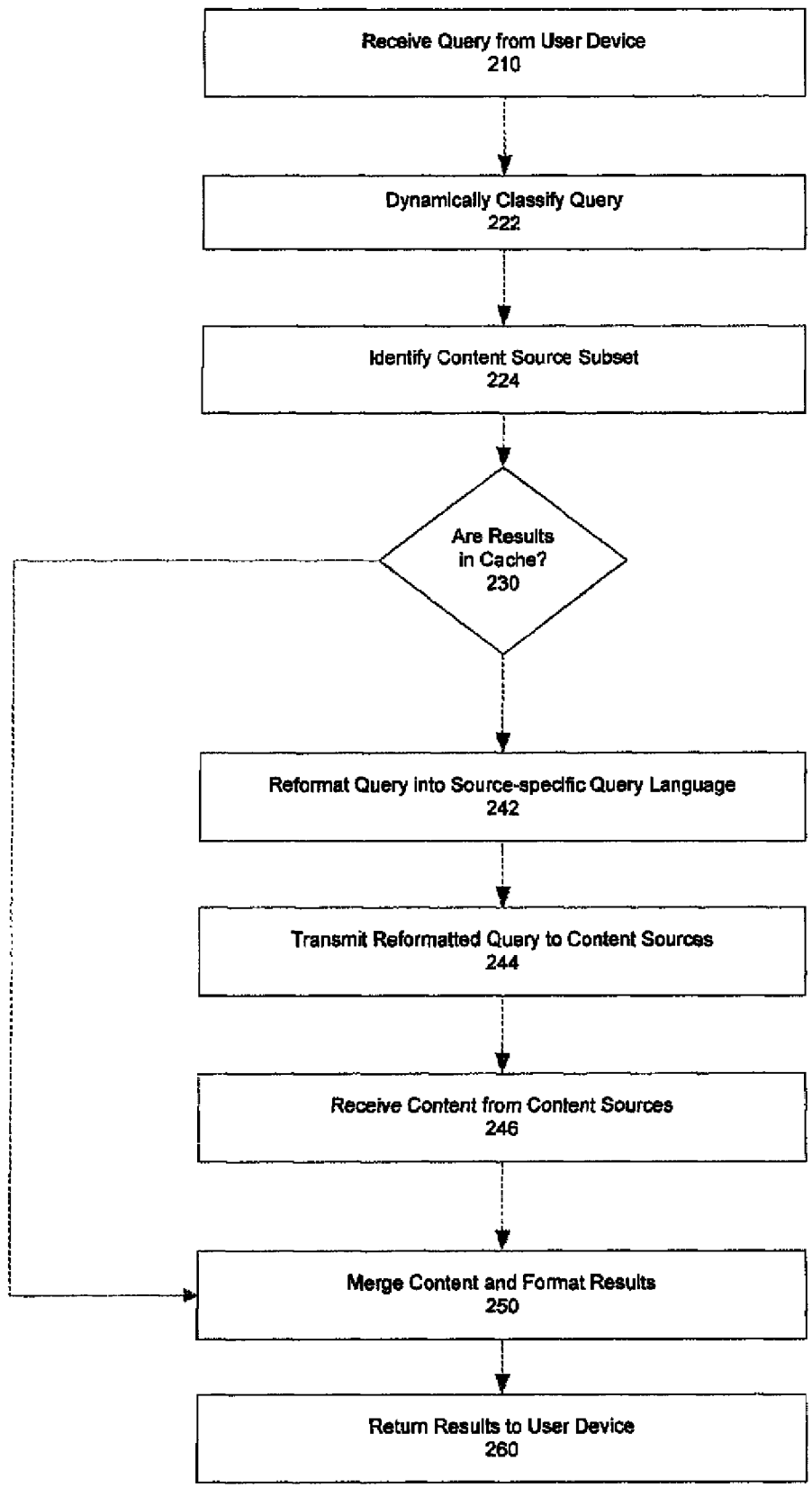
FIG. 2 is an exemplary flowchart illustrating a method for query execution, according to an embodiment of the present invention.

FIG. 2 is an exemplary flowchart illustrating a method for query execution, according to an embodiment of the present invention. A method of an embodiment of the present invention selects a relevant subset of possible content sources available to a search engine, such as a federated search engine, sends a reformatted query to each source in the subset, receives and caches each results set, then merges the results sets into a single combined results set.

As shown by FIG. 2, a query may be received from a user at step 210. At step 222, the query may be dynamically classified against one or more taxonomies organizing the content source library, content subject and functional aspects, and/or user and operator characteristics. At step 224, a content source subset may be identified from the source library. At step 230, results caches may be checked for pre-existing results sets. If no results exist in the cache for the query and query context, the Query Broker proceeds through steps 242, 244, and 246. At step 242, the query may be reformatted into the source-specific query language(s) particular to the content source subset. At step 244, the reformatted query may be transmitted to content sources, such as content providers, search engines, databases and/or other sources of data. At step 246, content may be received from the content sources and stored in local results caches. At step 250, results from content sources may be merged and further reformatted. At step 260, the results may be returned for display to the user. While the steps of FIG. 2 illustrate certain steps performed in a particular order, it should be understood that the embodiments of the present invention may be practiced by adding one or more steps to the processes, omitting steps within the processes and/or altering the order in which one or more steps are performed.

An embodiment of the present invention provides dynamic categorization of a user query and/or query state against a pre-categorized library of content sources. The query may be categorized at runtime by Query Processor 220, at step 222.

For example, a user may search for mobile phone games using the keyword, "auto racing". For example, the Query Processor 220, at step 222, may classify the query as a "Mobile Game" query and thereby identify a set of mobile game content sources. In addition, the granularity of the query category may be adjusted to refine the search results. For example, the query may be a request for games about auto racing. In this case, the query may be categorized as "Mobile Game" and "Action." Accordingly, a content source subset may be identified as maximally relevant to the combination of the two categories. Other variations may be applied.

By dynamically computing a set of sources relevant to the user's information request at the time a query is presented, an embodiment of the present invention maximizes precision for the query. In addition, the amount of data transmitted over the network may be minimized over other federated search technologies, thereby providing efficient bandwidth utilization. Furthermore, topology of the federated search source selection mechanism readily supports a multi-tier hierarchy of search engines and metasearch engines, thereby facilitating the scalability of the search system to any number of content collections, search engines and/or other sources of data.

At step 224, a content source subset may be identified. The categorization functionality of the Query Processor 220 may select or identify a relevant content source subset from a library of possible sources.

At step 230, one or more results caches may be checked. In accordance with an embodiment of the present invention, results caches may be checked for previously returned results. An embodiment of the present invention may be directed to retrieving results for a query from cache thereby allowing reuse of the results for identical and/or related queries from other users. As a result, network transmission may be minimized and the effects of network latency to the users may be reduced. Therefore, if it is determined that query results are already stored in a local internal or external cache, these results may be used directly or merged with results from other search engines, at step 250 for return to the user.

If no results were in cache, at step 242, the query may be reformatted into source-specific query language. For example, the Query Broker System may reformat the query into the source-specific query language for one or more content sources. At step 244, the reformatted query may be transmitted to content sources.

At step 246, content may be received from the respective content sources. In addition, each content source may pre-determine scores, ranking and/or other rating for the content in their respective collections pursuant to the query. Further, the results items may show an implicit ranking by being transmitted to the Query Broker System as an ordered results list. The Query Broker System 240 may receive the results from the individual content sources (e.g., search engines, databases, other sources of data, etc.) and further store the results in local internal or external results caches. Local results caches may be specified by a query, a specific content source, a group of sources, the type of source and/or other categorizations.

At step 250, content from the content sources may be merged and further formatted. After individual results are received or when a time threshold passes, the program may merge the source-specific results according to a merging algorithm or program, which may include local ranking scores, source ordering values, source-specific general scores, usage scores, user or distributor scores, and/or other factors. At step 250, the combined results list is compiled to produce a single ranked results list for the user. The separate, source-specific and combined lists are also reusable within a configurable time period for response to subsequent queries by the same or other users. In addition, duplicate results may be retained or removed and other preferences may be applied to the results. The results may include a content source reference with each result item to indicate the content source. For example, an embodiment of the present invention may be directed to merging the results in an order based on various factors, which may involve source factors, such as content quality and extensiveness, content source latency and reliability, business relationships, externally determined quality ratings (such as Zagat ratings, etc.), individual and community usage patterns, and/or other ratings and calculations. In addition, the results may also be ranked based on text and metadata relevancy, and/or other result-specific criteria.

For example, at least one global statistic related to content items in the results set may be computed. This may include a score normalization factor comprised of the results item rank and the source rating. In addition, content relevancy scores for the results items from the content sources may be determined, in accordance with the global statistic. Further, the scores may be normalized in accordance with the normalization factor for the metacollection, an external similarity scores, and the results metacollection items order as returned from the content sources in accordance with the source statistic.

At step 260, the results may be displayed to the user. User device specifics and/or user preferences may be considered when displaying the results to the user. For example, as mobile devices may have screen size limitations, the results item description or title may be truncated and/or otherwise modified to accommodate the user's device and/or other preferences.

Figure 3:
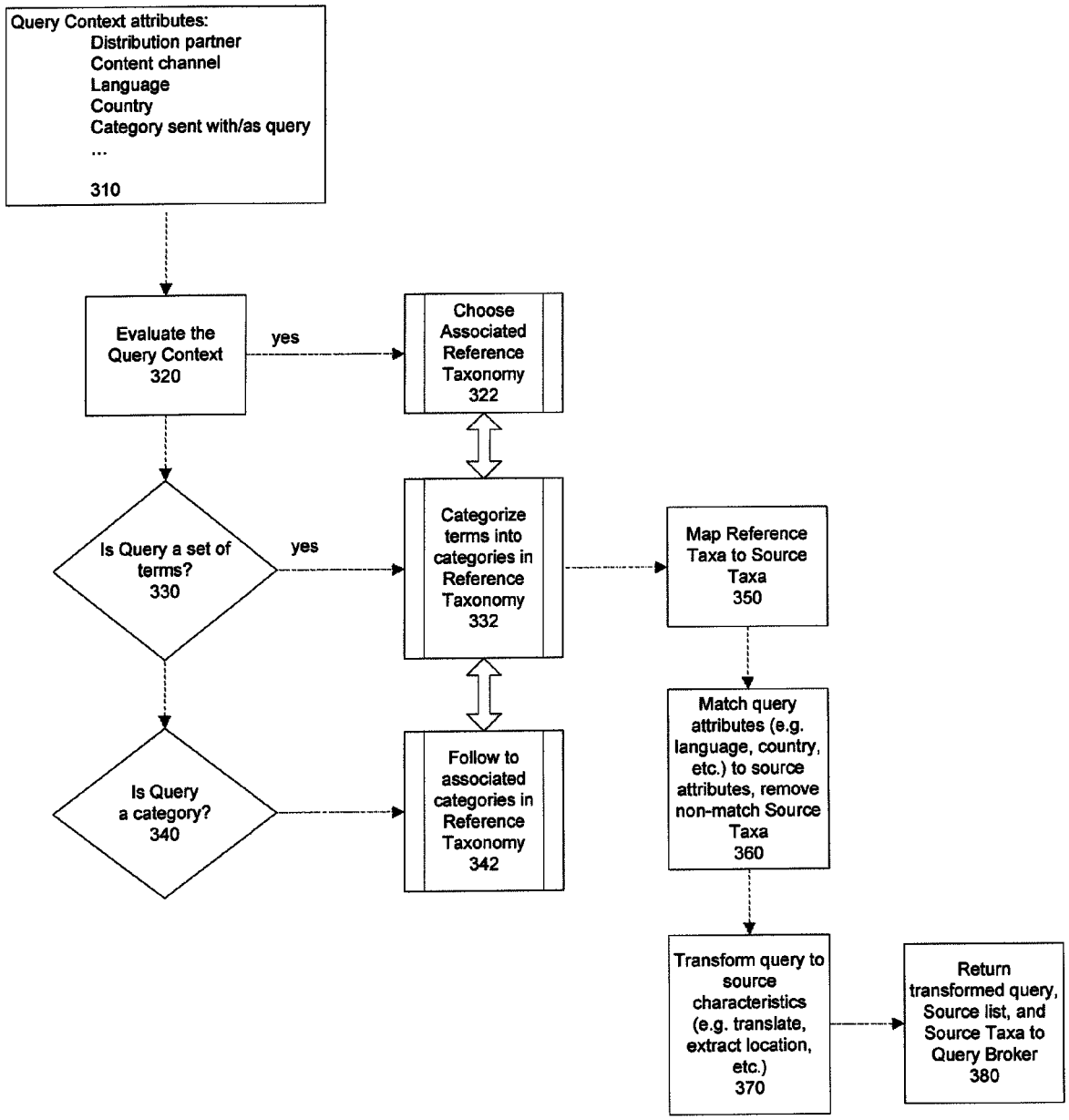
FIG. 3 is an exemplary flowchart illustrating a method for intelligent source selection, according to an embodiment of the present invention.

FIG. 3 is an exemplary flowchart illustrating a method for intelligent source selection, according to an embodiment of the present invention. An embodiment of the present invention is directed to identify a relevant content source subset from a source library of search engines and databases. The categorization process may analyze the query and its attributes and identify a relevant subset of content sources. Query Processor may utilize a categorization process to assign a query to a relevant taxon or taxa in the reference taxonomy and choose the optimal set of related source taxa which uniquely identify content sources.

At step 310, one or more query context attributes may be identified. For example, attributes may include distributor, vertical search channel, language, country, artist, title, price, and/or other metadata associated with the query and/or user.

At step 320, the computer program may evaluate the query context attribute values. Associated reference taxonomy may be selected, at step 322 in response to the vertical search selection and other context parameter values. The computer program may determine whether the query is a set of terms or a category, at step 330. Terms may refer to word(s), phrase(s), etc. If so, the terms may be assigned to categories in the associated reference taxonomy or taxonomies, at step 332 using a dynamic machine classification process. The computer program determines whether the query is a category from the display taxonomy, at step 340. If so, an associated category may be identified in the reference taxonomy, at step 342. At step 350, the selected reference taxonomy category may be related with the source taxon or taxa associated with each selected content source. At step 360, the query and query context values may be transformed to match source metadata fields and values, which may involve translation, user preference extraction, etc. At step 370, query context attributes (e.g., language, country, etc.) may be matched to one or more source attributes and the context attribute names may be mapped to source attribute names. At step 380, the source taxa list, matching metadata attribute names and values and transformed query may be returned to the Query Broker System.

Figure 4:
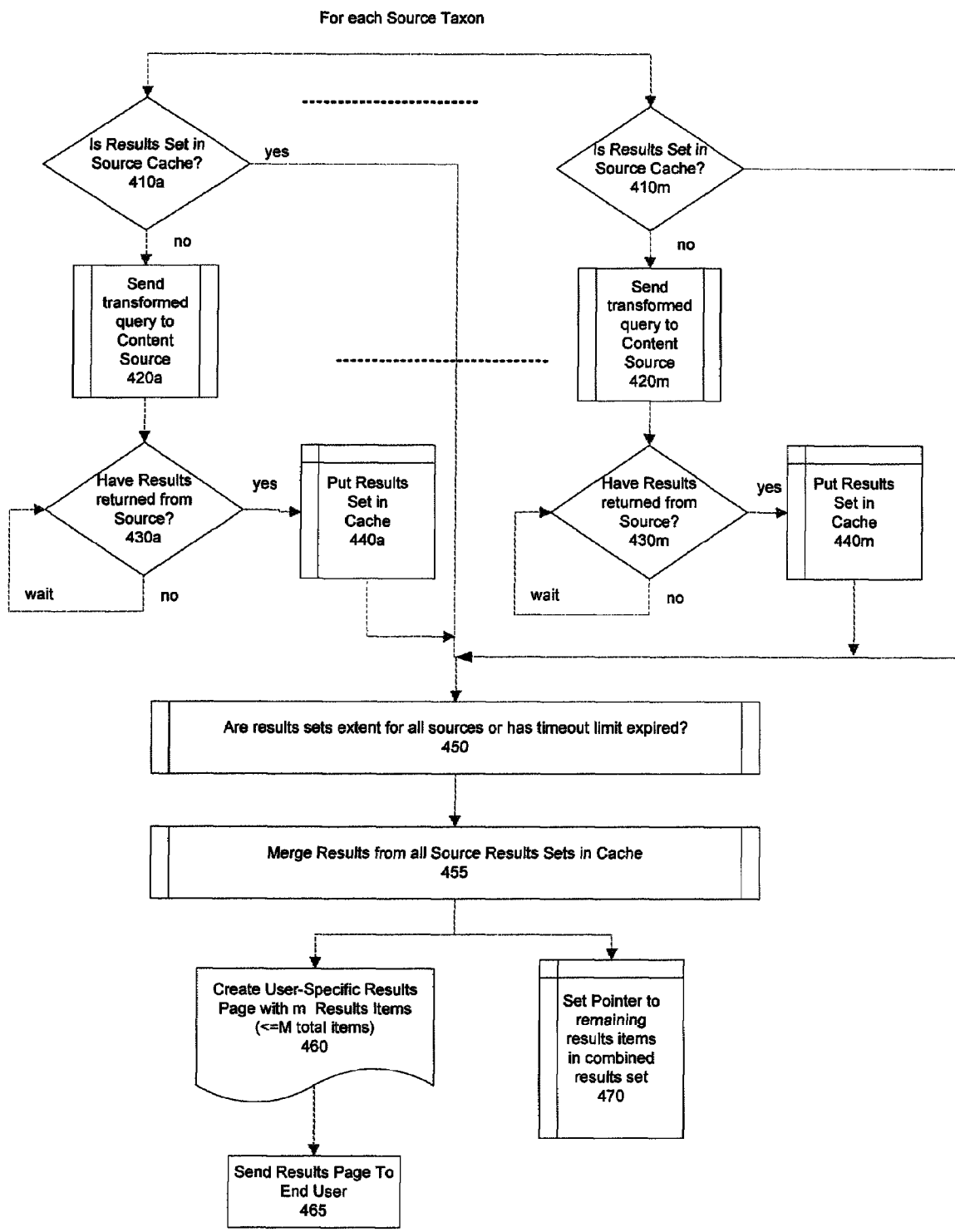
FIG. 4 is an exemplary flowchart illustrating a method for accessing, storing and merging result lists, according to an embodiment of the present invention.

FIG. 4 is an exemplary flowchart illustrating a method for accessing, storing and merging result lists, according to an embodiment of the present invention. As discussed above, a subset of sources may be identified and the associated taxon is returned to the query broker system. For each source and the query, it may be determined whether an existing result set resides in a results cache, at step 410a . . . 410m and 450. If results exist, they are merged at step 455 based on the incoming query context attribute values. At this step, previously stored results may be retrieved from the results cache(s).

If results do not exist, the query may be reformatted into a source-specific query language and transmitted to a respective content source, at step 420a . . . 420m. The query broker system may wait for results from each source, at step 430a . . . 430m. A wait timeout, or other predetermined condition, may be implemented to ensure efficiency. Once the results are received, the results may be stored in the results cache, at step 440a . . . 440m. At step 450, it may be determined whether all sources have returned results or the timeout limit has expired. At step 455, all results items in cached results sets are merged into a single, combined results set based on the incoming query context attribute values. The merging algorithm may then cache the merged list to produce a single ranked results list.

As shown by step 460, additional processing may involve taking the top or next m items from the combined results set to create a user-specific results page. In addition, the query broker system may check the results list for duplicates and group, remove or retain them according to system and distributor preferences. This step may consider query context attributes such as, but not limited to, device specifics, user preferences, and/or distributor limitations in creating the results page. At step 465, the results page may be sent to the user via a wired or wireless communication channel. At step 470, a pointer may be set to the remaining results items in the combined results list (at the m+1th result item).

Figure 5:
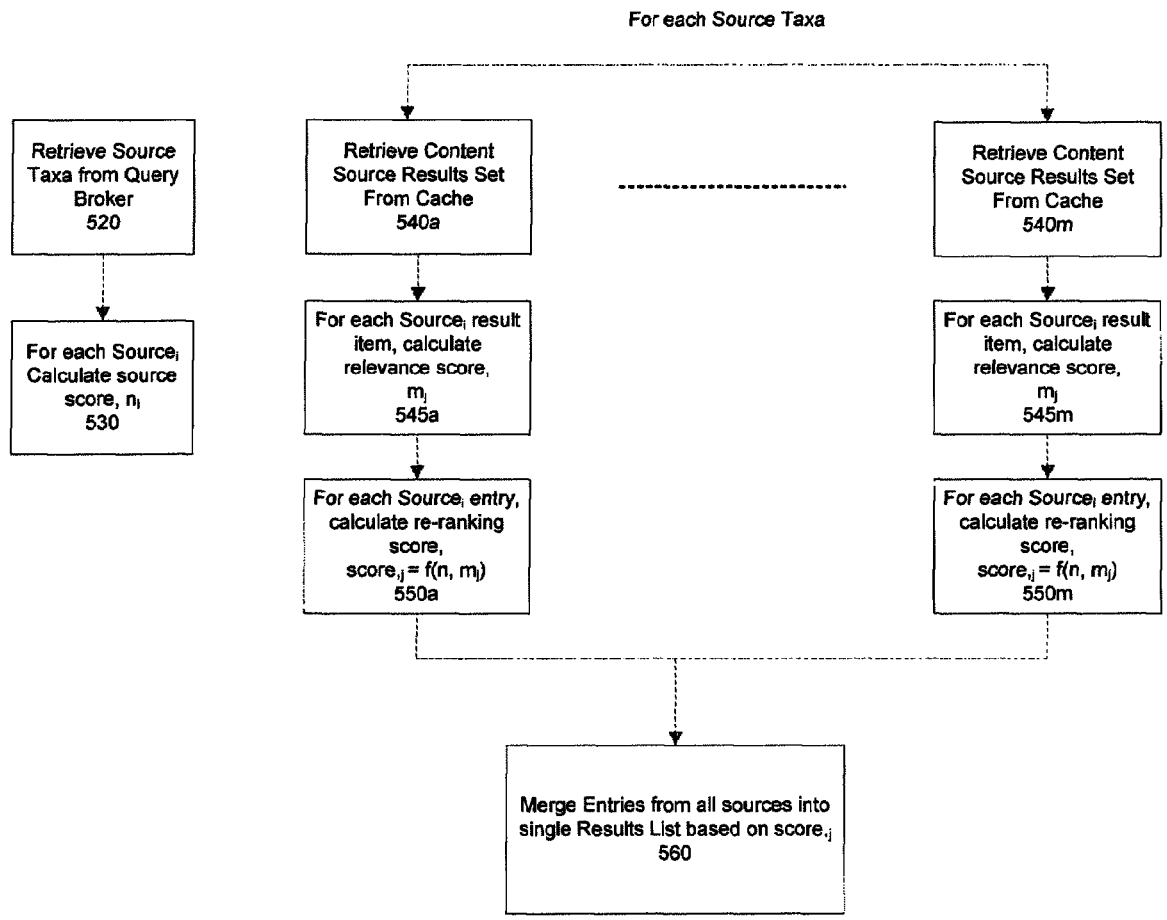
FIG. 5 is an exemplary flowchart illustrating a merging process, according to an embodiment of the present invention.

The merging process may calculate a global statistic for each results item in each results set returned by sources in response to a query. This global statistic is a function of two or more factors: the relevance of the result item to the query, represented by a similarity score or ranking determined by the source and included explicitly or implicitly with the results items; and external characteristics such as, but not limited to, a source rating, usage parameter values, user preference score, or distributor preference value. FIG. 5 is an exemplary flowchart illustrating a merging process using rank order as the results item score and source ratings to represent external characteristics, according to an embodiment of the present invention.

After all individual results are received, the query broker system may merge the results according to a merging algorithm which includes general scores (e.g., $n_j$) and results-specific relevance scores (e.g., $m_j$). For example, source taxa may be retrieved using taxa identifiers stored in the query context at step 520. At step 530, for each source, a source score (e.g., $n_i$) may be calculated from attribute values stored in each source taxon. For each source, results items are retrieved from the associated cache, at step 540a . . . 540m For each source results item, an item score (e.g., $m_j$) may be determined, at steps 545a . . . 545m; and a reranking score (e.g., $score_{ij} = f(n_i, m_j)$) calculated, at steps 550a . . . 550m. The query broker may compile the merged list using $score_{ij}$ to produce a single ranked results list for the user, as shown by step 560.

FIG. 6 is an exemplary illustration of reranking results items from results sets returned by multiple sources, according to an embodiment of the present invention. In this example, Source A may have a source rating, $n_A$, of 80 and Source B may have a source rating, $n_B$, of 50, as shown by 600a and 600b, respectively. A local statistic for each item in the respective results sets may be calculated as a function of the item order, $m_{Aj}$ and $m_{Bj}$, as shown by 610a and 610b. A global statistic, the reranking $score_{ij}$, may be calculated as a function of the result item rank, $m_{ij}$, and the source rating, $n_i$, such that $score_{ij}$ for each results item is the product of the inverse rank for each result item multiplied by the source rating, as shown by 640a and 640b. The combined results set contains items from Source A and items from Source B and is arranged by sorting the respective results items by their associated global $score_{ij}$, as shown by 650.

As discussed above, each content source (e.g., search engine, database, etc.) may determine scores for the content in the respective collections pursuant to the query. The Connector Framework may receive the results from the individual search engines, calculate local ranking scores per item, and store the results, which may include respective ranking and/or other scores, in source-specific caches. After all individual results are received a time threshold passes or other precondition is met, the query broker system may merge the results according to a merging algorithm. The merging algorithm may consider local ranking scores, source specific general scores and/or other factors and conditions.

According to an embodiment of the invention, the systems and processes described in this invention may be implemented on any general or special purpose computational device, either as a standalone application or applications, or even across several general or special purpose computational devices connected over a network and as a group operating in a client-server mode. According to another embodiment of the invention, a computer-usable and writeable medium having a plurality of computer readable program code stored therein may be provided for practicing the process of the present invention. The process and system of the present invention may be implemented within a variety of operating systems, such as a Windows® operating system, various versions of a Unix-based operating system (e.g., a Hewlett Packard or a Red Hat Linux version of a Unix-based operating system), or various versions of an AS/400-based operating system. For example, the computer-usable and writeable medium may be comprised of a CD ROM, a floppy disk, a hard disk, or any other computer-usable medium. One or more of the components of the system or systems embodying the present invention may comprise computer readable program code in the form of functional instructions stored in the computer-usable medium such that when the computer-usable medium is installed on the system or systems, those components cause the system to perform the functions described. The computer readable program code for the present invention may also be bundled with other computer readable program software. Also, only some of the components may be provided in computer-readable code.

Additionally, various entities and combinations of entities may employ a computer to implement the components performing the above-described functions. According to an embodiment of the invention, the computer may be a standard computer comprising an input device, an output device, a processor device, and a data storage device. According to other embodiments of the invention, various components may be computers in different departments within the same corporation or entity. Other computer configurations may also be used. According to another embodiment of the invention, various components may be separate entities such as corporations or limited liability companies. Other embodiments, in compliance with applicable laws and regulations, may also be used.

According to one specific embodiment of the present invention, the system may comprise components of a software system. The system may operate on a network and may be connected to other systems sharing a common database and common servers operating additional data or application services. Other hardware arrangements may also be provided.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

While the invention has been particularly shown and described within the framework of claims processing, it will be appreciated that variations and modifications can be effected by a person of ordinary skill in the art without departing from the scope of the invention. Furthermore, one of ordinary skill in the art will recognize that such processes and systems do not need to be restricted to the specific embodiments described herein.

The invention claimed is:

1. A computer implemented method for processing a query, the method comprising the steps of:
   receiving a query at a computer implemented search engine from a user device via a network;
   categorizing the query to identify via a taxonomy a plurality of content sources stored in electronic storage, wherein the categorization is dynamically performed, independent of user input, by a module communicatively coupled with the computer implemented search engine;
   formatting the query to at least one source specific query language based on at least one of the plurality of identified content sources, wherein the formatting is performed, independent of user input, by a module communicatively coupled to the computer implemented search engine;
   transmitting the formatted query for the at least one of the plurality of content sources to the at least one of the plurality of content sources;
   receiving results from the at least one of the plurality of content sources, the results containing one or more local ranking statistics that are dynamically computed at each content source in response to the formatted query, the one or more local ranking statistics related to one or more terms associated with the formatted query and to metadata in a query context;
   merging the results from the at least one of the plurality of content sources based at least in part on one or more factors and the one or more local ranking statistics, wherein merging the results based at least in part on one or more factors includes merging based on a source rating comprising a response latency; and
   formatting the results for delivery to the user device over the network.

2. The method of claim 1, wherein the one or more factors comprise global and local factors.

3. The method of claim 1, wherein the user device comprises one or more of an internet-enabled input device, an internet or voice-enabled mobile device, a voice-enabled input device, a computer, and a kiosk.

4. The method of claim 1, wherein at least one of the plurality of content sources comprises one or more of access interfaces to search engines, ad engines, and databases associated with the content sources.

5. The method of claim 1, wherein the one or more factors comprise at least one or more of editorial rating, response reliability, content relevance and content extensiveness or coverage.

6. The method of claim 1, wherein the one or more factors comprise at least one or more of user preferences, usage statistics, query frequency, category frequency, distributor preferences, recommendation statistics, user-generated ratings, and/or business relationships.

7. The method of claim 1, wherein the one or more factors comprise at least one or more of statistics associated with results item textual or non-textual analysis, data or text mining analyses, data or textual clustering, and/or non-textual pattern analysis.

8. The method of claim 1, wherein the one or more factors comprise at least one or more of statistics associated with device specifics and/or formatting specifications.

9. The method of claim 1, wherein the one or more factors comprise at least one or more of user demographic characteristics, location, language, social networks, social groups, and personalization characteristics.

10. The method of claim 1, wherein the one or more factors comprise at least one or more of page size, graphic, text elements, and text.

11. The method of claim 1, wherein the one or more factors comprise at least one or more of source rating, reliability factor and latency factor.

12. The method of claim 1, wherein the one or more factors comprise at least one or more of business rules, business relationships, demographic preferences, and marketing goals.

13. The method of claim 1, wherein the one or more factors comprise at least one or more of local ranking scores, source ordering values, source-specific general scores and source factors.

14. The method of claim 1, wherein the one or more factors comprise at least one or more of result-based ranking, relevancy, accuracy and usage factors wherein usage factors comprise one or more of demographics, traffic patterns, user personalization and community value.

15. The method of claim 1, wherein the query is classified into a category in one or more taxonomy or controlled vocabulary.

16. The method of claim 1, wherein the results are merged based at least in part on one or more of textual relevance, user preference, order, relevance or similarity score, and/or result item factors.

17. The method of claim 16, wherein the result item factors comprise one or more of source ratings, metadata relevancy factor, similarity factor, ranking factor, distributor preferences, usage patterns, location, device specifications, query frequency and/or category frequency.

18. The method of claim 1, further comprising the step of:
   dynamically computing one or more local ranking statistics for each results item related to one or more terms associated with the query and related to metadata in the query context in response to the query, at each content source.

19. The method of claim 1, further comprising the steps of:
   computing at least one global statistic related to one or more content items in the results sets; and
   computing a normalization factor.

20. The method of claim 19, further comprising the step of: determining one or more relevancy scores for the results items from at least one of the plurality of content sources in accordance with the at least one global and/or one local statistic.

21. The method of claim 19, further comprising the step of: normalizing the one or more relevancy scores in accordance with the normalization factor.

22. The method of claim 19, further comprising the step of: combining the results into a single results set based on an ordering determined by the normalization factor.

23. The method of claim 1, further comprising the step of: storing results from each content source in one or more caches.

24. The method of claim 23, further comprising the steps of:
accessing the one or more caches to retrieve existing results; and
formatting the retrieved existing results based on one or more query context parameters.

25. The method of claim 23, wherein the step of accessing the one or more caches mitigates one or more source behaviors.

26. The method of claim 1, wherein the step of categorizing the query occurs dynamically at the time the query is received.

27. The method of claim 1, further comprising the step of: identifying one or more duplicate results.

28. The method of claim 27, further comprising the step of: removing the one or more duplicate results according to one or more of user preference, device preference and distributor preference.

29. The method of claim 27, further comprising the step of: retaining the one or more duplicate results according to one or more of user preference, device preference and distributor preference.

30. A non-transitory computer readable storage medium for storing a computer program of instructions configured to be readable by at least one processor for instructing the at least one processor to execute a computer process to perform the acts of the method of claim 1.

31. A computer implemented system for processing a query, the system comprising:
a receiving module, of a computer implemented search engine, to receive a query from a user device over a network, wherein the computer implemented search engine enables processing of the query independently of the state of the user device;
a categorizing module, communicatively coupled with the computerized search engine, to dynamically categorize the query, independent of user input, to identify via a taxonomy a plurality of content sources stored in electronic storage;
a formatting module to format the query to at least one source specific query language based on at least one of the plurality of identified content sources, wherein the formatting is performed, independent of user input, by a module communicatively coupled to the computer implemented search engine;
a transmitting module to transmit the formatted query for the at least one of the plurality of content sources to the at least one of the plurality of content sources;
a results processor to receive results from the at least one of the plurality of content sources, the results containing one or more local ranking statistics that are dynamically computed at each content source in response to the formatted query, the one or more local ranking statistics related to one or more terms associated with the formatted query and to metadata in a query context;
a merging module to merge results in response to the formatted query from the at least one of the plurality of content sources based at least in part on one or more factors and the one or more local ranking statistics, wherein merging the results based at least in part on one or more factors includes merging based on a source rating comprising a response latency; and
a results module to format the results for delivery to the user device over the network.

32. The system of claim 31, wherein the one or more factors comprise one or more global and/or local factors.

33. The system of claim 31, wherein the user device comprises one or more of an internet-enabled input device, an internet or voice-enabled mobile device, a voice-enabled input device, a computer, and a kiosk.

34. The system of claim 31, wherein at least one of the plurality of content sources comprises one or more of access interfaces to search engines, ad engines, and databases associated with the content sources.

35. The system of claim 31, wherein the one or more factors comprise at least one or more of editorial rating, response reliability, content relevance and content extensiveness or coverage.

36. The system of claim 31, wherein the one or more factors comprise at least one or more of user preferences, usage statistics, query frequency, category frequency, distributor preferences, recommendation statistics, user-generated ratings, and/or business relationships.

37. The system of claim 31, wherein the one or more factors comprise at least one or more of statistics associated with results item textual or non-textual analysis, data or text mining analyses, data or textual clustering, and/or non-textual pattern analysis.

38. The system of claim 31, wherein the one or more factors comprise at least one or more of statistics associated with device specifics and/or formatting specifications.

39. The system of claim 31, wherein the one or more factors comprise at least one or more of user demographic characteristics, location, language, social networks, social groups, and personalization characteristics.

40. The system of claim 31, wherein the one or more factors comprise at least one or more of page size, graphic, text elements, and text.

41. The system of claim 31, wherein the one or more factors comprise at least one or more of source rating, reliability factor and latency factor.

42. The system of claim 31, wherein the one or more factors comprise at least one or more of business rules, business relationships, demographic preferences, and marketing goals.

43. The system of claim 31, wherein the one or more factors comprise at least one or more of local ranking scores, source ordering values, source-specific general scores and source factors.

44. The system of claim 31, wherein the one or more factors comprise at least one or more of result-based ranking, relevancy, accuracy and usage factors wherein usage factors comprise one or more of demographics, traffic patterns, user personalization and community value.

45. The system of claim 31, wherein the query is classified into a category in one or more taxonomy or controlled vocabulary.

46. The system of claim 31, wherein the results are merged based at least in part on one or more of textual relevance, user preference, order, relevance or similarity score, and/or result item factors.

47. The system of claim 46, wherein the result item factors comprise one or more of source ratings, metadata relevancy factor, similarity factor, ranking factor, distributor preferences, usage patterns, location, device specifications, query frequency and/or category frequency.

48. The system of claim 31, further comprising the step of:
dynamically computing one or more local ranking statistics for each results item related to one or more terms associated with the query and related to metadata in the query context in response to the query, at each content source.

49. The system of claim 31, further comprising:
a module for computing at least one global statistic related to one or more content items in the results sets; and computing a normalization factor.

50. The system of claim 49, wherein one or more relevancy scores are determined for the results items from the one or more content sources in accordance with the at least one global and/or one local statistic.

51. The system of claim 49, wherein the one or more relevancy scores are normalized in accordance with the normalization factor.

52. The system of claim 49, wherein the results are combined into a single results set based on an ordering determined by the normalization factor.

53. The system of claim 31, further comprising:
one or more caches for storing results from each content source.

54. The system of claim 53, wherein the one or more caches are accessed to retrieve existing results; and wherein the retrieved existing results are formatted based on one or more query context parameters.

55. The system of claim 53, wherein accessing the one or more caches mitigates one or more source behaviors.

56. The system of claim 31, wherein categorizing the query occurs dynamically at the time the query is received.

57. The system of claim 31, wherein one or more duplicate results are identified.

58. The system of claim 57, wherein the one or more duplicate results are removed according to one or more of user, device and distributor preferences.

59. The system of claim 57, wherein the one or more duplicate results are retained according to one or more of user, device and distributor preferences.

* * * * *